(12) United States Patent
Montalban (10) Patent No.: US 10,642,065 B2
(45) Date of Patent: May 5, 2020

(54) ELASTIC HINGE FOR EYEGLASSES

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.p.A., Susegana (IT)

( * ) Notice: Subject to any disclaimer, the term of this patent is extended or adjusted under 35 U.S.C. 154(b) by 0 days.

(21) Appl. No.: 16/351,559

(22) Filed: Mar. 13, 2019

(65) Prior Publication Data
US 2019/0285910 A1    Sep. 19, 2019

(30) Foreign Application Priority Data
Mar. 14, 2018  (IT) .................. 102018000003566

(51) Int. Cl.
*G02C 5/22*            (2006.01)

(52) U.S. Cl.
CPC ......... *G02C 5/2245* (2013.01); *G02C 5/2236* (2013.01); *G02C 2200/06* (2013.01); *G02C 2200/26* (2013.01)

(58) Field of Classification Search
CPC .. G02C 5/2245; G02C 5/2236; G02C 5/2227; Y10T 16/526
See application file for complete search history.

(56) References Cited

U.S. PATENT DOCUMENTS

| | | | | |
|---|---|---|---|---|
| 3,110,057 A * | 11/1963 | Urich | ................... | G02C 5/2209 16/228 |
| 3,957,360 A * | 5/1976 | Villani | ................ | G02C 5/2227 351/113 |
| 4,244,081 A * | 1/1981 | Beyer | .................. | G02C 5/2227 16/228 |
| 4,747,183 A | 5/1988 | Drlik | | |
| 4,832,479 A * | 5/1989 | Beyer | ....................... | G02C 5/10 351/153 |
| 5,224,248 A * | 7/1993 | Brilliant | ............... | G02C 5/2281 16/228 |
| 5,627,608 A * | 5/1997 | Chao | .................... | G02C 5/2227 16/228 |
| 5,815,899 A * | 10/1998 | Chao | ..................... | G02C 5/008 29/20 |

(Continued)

FOREIGN PATENT DOCUMENTS

DE  2242044  2/1974
EP  0615149  9/1994
(Continued)

*Primary Examiner* — Jason W San
(74) *Attorney, Agent, or Firm* — Mark M. Friedman (57) ABSTRACT

Elastic hinge for the plastic frame of eyeglasses, which comprises a first articulation element and a second articulation element, wherein the first articulation element comprises a box-like body provided with a seat and a carriage provided with a rod-like element inserted in the seat and with a head externally projecting from the seat and coupled with the second articulation element. A bush is slidably mounted on the rod-like element, and a spring thrustingly acts on such bush. A fork-shaped body is inserted from the outside into a hole of the box-like body and is engaged with the bush in a straddling manner in order to retain the latter with respect to sliding along the longitudinal axis of the rod-like element.

8 Claims, 10 Drawing Sheets

(56) References Cited

U.S. PATENT DOCUMENTS

| | | | | |
|---|---|---|---|---|
| 5,889,575 A * | 3/1999 | Wang | G02C 5/2236 | 16/228 |
| 6,163,926 A * | 12/2000 | Watanabe | G02C 5/22 | 16/228 |
| 6,210,004 B1 * | 4/2001 | Horikawa | G02C 5/2209 | 16/228 |
| 6,393,664 B1 * | 5/2002 | Habegger | E05D 11/1014 | 16/228 |
| 6,481,053 B2 * | 11/2002 | Desbiez-Piat | G02C 5/008 | 16/228 |
| 6,585,371 B1 * | 7/2003 | Lin | G02C 5/2236 | 351/113 |
| 6,623,115 B1 * | 9/2003 | Kun-Yuan | G02C 5/2227 | 16/228 |
| 6,721,991 B2 * | 4/2004 | Dioguardi | G02C 5/2227 | 16/228 |
| 6,814,438 B2 * | 11/2004 | Desbiez-Piat | G02C 5/2227 | 16/228 |
| 6,910,247 B1 * | 6/2005 | Tabacchi | G02C 5/2236 | 16/228 |
| 7,380,935 B2 * | 6/2008 | Ifergan | G02C 5/10 | 351/153 |
| 7,775,658 B2 * | 8/2010 | Antoniacomi | G02C 5/2227 | 16/228 |
| 8,192,017 B2 * | 6/2012 | Chen | G02C 5/2209 | 16/228 |
| 8,256,894 B2 * | 9/2012 | Ifergan | G02C 5/10 | 16/228 |
| 9,696,562 B2 * | 7/2017 | Sbardella | G02C 5/2245 | |
| 10,365,501 B2 * | 7/2019 | Yang | G02C 5/2236 | |
| 2003/0020867 A1 * | 1/2003 | Dei Negri | G02C 5/2209 | 351/153 |
| 2005/0078272 A1 * | 4/2005 | Quehin | G02C 5/10 | 351/153 |
| 2006/0179609 A1 * | 8/2006 | Huang | G02C 5/10 | 16/228 |
| 2012/0117755 A1 * | 5/2012 | Walhorn | E05F 3/104 | 16/66 |
| 2012/0117758 A1 * | 5/2012 | Walhorn | E05F 1/1253 | 16/321 |
| 2013/0000077 A1 * | 1/2013 | Thompson | G02C 5/2209 | 16/228 |
| 2015/0049299 A1 * | 2/2015 | Delamour | G02C 5/2236 | 351/153 |
| 2016/0041405 A1 * | 2/2016 | Zatta | G02C 5/2209 | 351/121 |
| 2016/0377883 A1 * | 12/2016 | Montalban | G02C 5/22 | 351/178 |
| 2017/0139229 A1 * | 5/2017 | Montalban | G02C 5/2236 | |
| 2019/0033616 A1 * | 1/2019 | Kacavenda | G02C 5/2236 | |
| 2019/0162983 A1 * | 5/2019 | Montalban | G02C 5/2227 | |
| 2019/0243160 A1 * | 8/2019 | Montalban | G02C 5/008 | |
| 2019/0361265 A1 * | 11/2019 | Sonthonnax | G02C 5/2263 | |

FOREIGN PATENT DOCUMENTS

| | | |
|---|---|---|
| EP | 1617276 | 1/2006 |
| WO | 0229476 | 4/2002 |
| WO | 2004057409 | 7/2004 |

* cited by examiner

ELASTIC HINGE FOR EYEGLASSES

FIELD OF APPLICATION

The present invention regards an elastic hinge for eyeglasses.

The present hinge is advantageously intended to be employed in the production of eyeglasses; in particular the method for the assembly thereof is susceptible of being used during the eyeglass production process, during which the temples are mechanically connected to the end piece.

Therefore, the present hinge is inserted in the industrial field of eyeglasses, i.e. of production of eyeglasses and of accessories and components for eyeglasses.

STATE OF THE ART

As is known, in the field of eyeglasses, the hinges are employed for articulating the temples to the front of a frame.

Each hinge is for such purpose conventionally formed by two articulation elements, pivoted to each other, of which, respectively, a first element is fixed to a temple and a second element is fixed to lateral portion of the front of the frame (also known, in the technical jargon of the field, with the term "end piece").

In operation, the hinges allow the temples to rotate between a closed position, in which they are collected on the front of the eyeglasses, and an open position, in which they take on a substantially right-angle position with respect to the front adapted to allow the use thereof on the face of the user.

In particular, elastic hinges for eyeglasses are known, of the type in which the first articulation element comprises a box-like body delimiting a seat provided with an opening directed towards the second articulation element, and a carriage slidably housed within the seat of the aforesaid box-like body. More in detail, the carriage is provided with a head partially projecting from the opening of the seat of the box-like body and with a rod-like element fixed to the rear of the head and provided, at the opposite end with respect to the head, with an enlarged terminal element. The first articulation element also comprises a helical spring, which is wound around the rod-like element and is provided with a first end which is in abutment against the enlarged terminal element and with a second end which is anchored to the box-like body by means of retention means.

The latter for example comprise a bush slidably mounted around the rod-like element, on which a screw is engaged that is transversely inserted in a threaded hole made on the box-like body, coming to stop the bush. As an alternative to the screw, it is possible to make a crimping point which, by locally deforming a portion of the box-like body, makes a protuberance which is engaged on the bush.

The elastic hinges of the above-described known type and the consequent method for the assembly thereof have demonstrated that they do not lack drawbacks.

A first drawback lies in the fact that once the hinge and in particular the first articulation element is assembled with the carriage housed in the box-like body, the disassembly, e.g. for its maintenance, is difficult. This is mainly due to the fact that the retention means are generally conceived, in particular when constituted by a crimping, in order to definitively fix the carriage within the box-like body.

Moreover, the assembly method steps involve a crimping or screwing operation that is not easy, requiring an automation with a careful quality control in order to monitor the conducted operation.

PRESENTATION OF THE INVENTION

In this situation, the problem underlying the present invention is to eliminate the drawbacks of the abovementioned prior art, by providing an elastic hinge for eyeglasses and a method for assembly of the aforesaid elastic hinge which allow easily dismounting the components of the elements of the elastic hinge for an easy substitution or maintenance thereof.

A further object of the present invention is to provide an elastic hinge comprising a carriage and a box-like body as well as retention elements which ensure retention stability of the aforesaid carriage in the box-like body.

A further object of the present invention is to provide an elastic hinge in which the aforesaid retention elements allow removably connecting the carriage to the box-like body.

A further object of the present invention is to provide an elastic hinge for an eyeglass frame in which the retention elements do not negatively affect the appearance of the hinge, rather they can form an ornament element thereof.

A further object of the present invention is to provide an elastic hinge for an eyeglass frame with alternative retention elements with respect to those already known for retaining the carriage to the box-like body.

BRIEF DESCRIPTION OF THE DRAWINGS

The technical characteristics of the finding, according to the aforesaid objects, and the advantages thereof will be more evident from the following detailed description, made with reference to the enclosed drawings, which represent several merely exemplifying and non-limiting embodiments of the invention, in which:

FIGS. 10A-10G illustrate the steps, advantageously in succession, of the method for assembly of the elastic hinge according to the present invention and in accordance with the embodiment of FIGS. 1-5.

DETAILED DESCRIPTION OF A PREFERRED EMBODIMENT

With reference to the enclosed drawings, reference number 1 overall indicates the elastic hinge for the eyeglass frame, object of the present invention.

The elastic hinge 1, according to the present invention, is intended for making frames for eyeglasses of any type and hence of both conventional and sport type and is adapted in a per se known and conventional manner to mutually articulate two parts of the eyeglass frame together.

More in detail, the frame is usually formed, in a per se conventional manner, by a front which supports a pair of lenses by means of two annular portions (or "circles") connected in the central part by a bridge, and by a pair of temples 2 pivoted by means of elastic hinges 1 to the sides of the front and, more precisely, to two lateral portions thereof directed towards the rear part of the eyeglasses and known in the technical jargon of the field with the term end piece 3.

In particular, the hinge 1 is of elasticized type, i.e. adapted to allow an over-travel during opening of the temples 2 with elastic return aimed to allow easily putting on the eyeglasses and aimed to ensure an improved fit of the same once worn on the head of the user.

In operation, the temples 2 can be moved, due to the aforesaid elastic hinges 1, in a per se entirely conventional manner, between a closed position, in which they are collected on the front of the eyeglasses, an open position, in which they assume a substantially right-angle position with respect to the front of the eyeglasses, and an over-travel position, in which they are forced beyond the aforesaid open position.

Advantageously the present invention refers to a hinge 1 of elastic type provided with the aforesaid over-travel function for easily putting on the glasses.

The present elastic hinge 1 also comprises, in a per se entirety conventional manner, two articulation elements, of which a first articulation element 4 is mechanically associable with a first plastic component of eyeglasses, which advantageously in accordance with the example reported in the enclosed figures is constituted by a temple 2 of the frame, and a second articulation element 5 is mechanically associable with a second component of eyeglasses, which advantageously in accordance with the example of the enclosed figures is constituted by the end piece 3 of the front of the frame.

Hereinbelow, reference will be made to the preferred solution of the enclosed figures in which the first plastic component of the frame is constituted by a temple 2 and the second plastic component is constituted by the end piece 3 of the frame; nevertheless, embodiments can be provided for where the two components are reversed, without departing from the protective scope of the present patent.

In particular, the first component for the eyeglass frame, the temple 2, defines a longitudinal extension direction indicated with the axis Y in the enclosed figures.

In accordance with the embodiments illustrated in the enclosed figures the first articulation element 4 constitutes the male element of the hinge, while the second articulation element 5 constitutes the female element of the hinge. However, nothing prohibits making a hinge 1 in accordance with the invention in which it is the first articulation element 4 to be a female element and the second articulation element 5 to be a male element.

Hereinbelow, for the sake of description simplicity, reference will be made to the embodiment in which: the first articulation element 4 constitutes the male element of the elastic hinge 1 and is mechanically associated with the temple 2 of the frame, and the second articulation element 5 constitutes the female element of the elastic hinge 1 and is mechanically associated with the end piece 3 of the frame.

Advantageously the first articulation element 4 is therefore extended along the aforesaid longitudinal extension direction Y parallel to that of longitudinal extension Y' of the temple.

The first articulation element 4 and the second articulation element 5 are rotatably coupled, e.g. in an entirely conventional manner, by means of a hinge pin not illustrated in the enclosed drawings. Such hinge pin is extended along an axis X substantially perpendicular with respect to the longitudinal extension direction of the first articulation element 4 indicated with Y.

The second articulation element 5 is for example obtained in an entirely conventional manner, with a shaped metal body provided with at least two parallel shoulders 7 that are projectingly extended from a common base fixed to the end piece of the frame. Otherwise the two shoulders 7 can be integrally made in the plastic of the same end piece 3. The two shoulders 7 are provided, in accordance with an embodiment described hereinbelow, with corresponding aligned and facing holes for the insertion of the hinge pin.

In accordance with the embodiments illustrated in the enclosed figures, the first articulation element 4 comprises a box-like body 9 delimiting a seat 900 provided with an opening 901 directed towards the second articulation element 5 and a carriage 10 slidably housed within the seat 900 of the box-like body 9.

More in detail, the carriage 10 comprises a head 8 at least partially projecting from the opening 901 of the seat 900 of the box-like body 9 and a rod-like element 11, provided with a main extension along the longitudinal direction Y, fixed to the rear of the head 8 towards the interior of the seat 900. The rod-like element 11 is then provided, at the opposite end with respect to the head 8, with an enlarged terminal element 12.

The latter can be obtained for example by means of screwing of a screw into the rod-like element 11 such that its head forms the enlarged terminal element 12, i.e. it can be obtained by means of deformation, e.g. by riveting of the end of the rod-like element 11.

The seat 900 of the box-like body 9 is extended along the direction identified by the axis Y of the extension of the box-like body 9 itself.

The abovementioned carriage 10 constitutes the movable part of the first articulation element 4, being susceptible of sliding in a guided manner within the seat 900 of the box-like body 9 along the direction Y in relation to the rotation movement of the temple 2 with respect to the end piece 3 of the eyeglasses.

The rod-like element 11 is completely contained within the seat 900 of the box-like body 9.

The head 8 is mechanically associated with the second articulation element 5, and in accordance with a possible embodiment is provided with a plate-like form with a through hole 80 transversely obtained, coaxial with the holes provided in the two shoulders 7 of the second articulation element 5 so as to allow the passage of the hinge pin.

Figure 1:
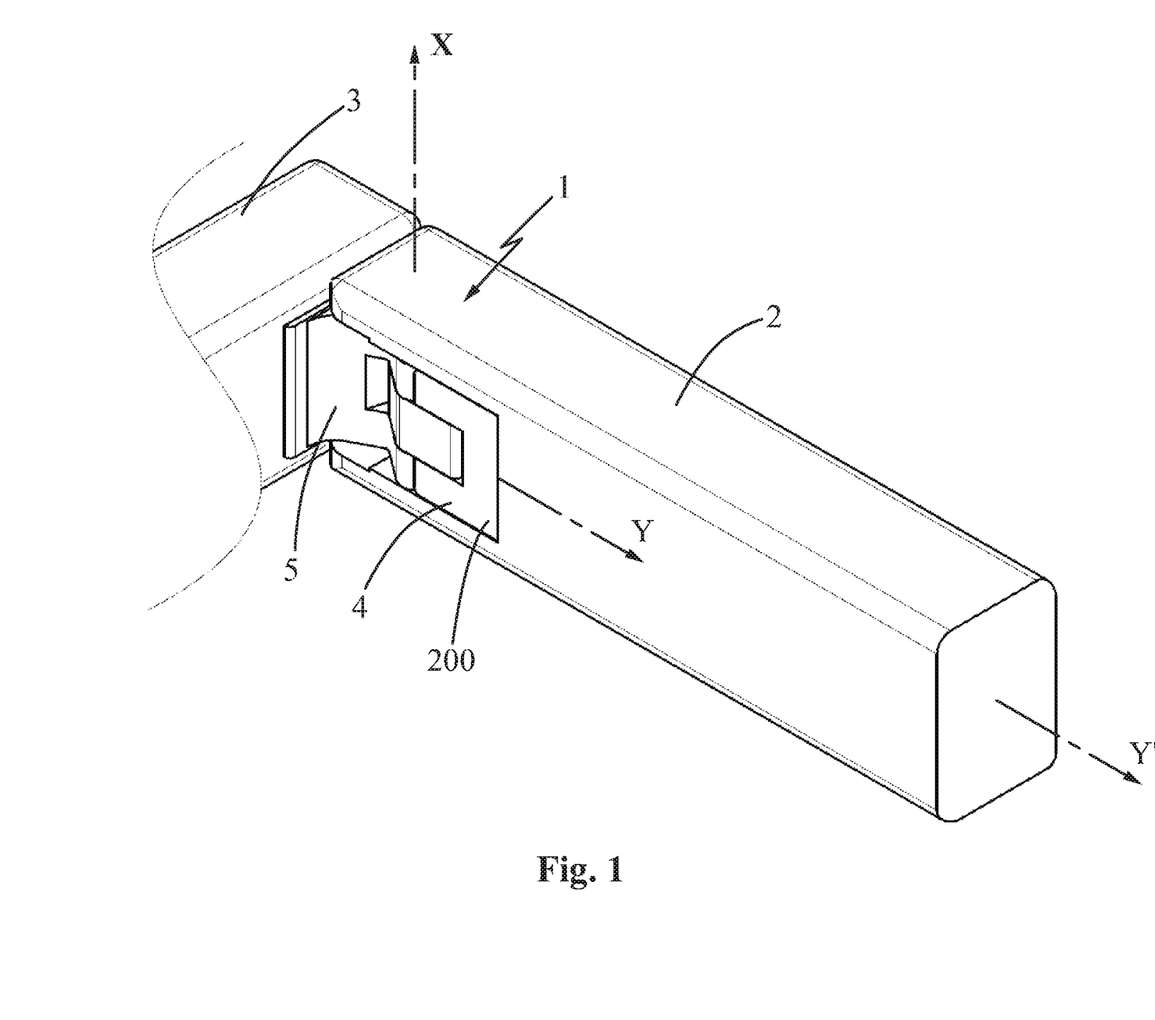
FIG. 1 shows an elastic hinge for plastic frames of eyeglasses according to the present invention, mounted to connect a temple and a front of a frame, illustrated only in part and with the temple in open position.
Figure 2:
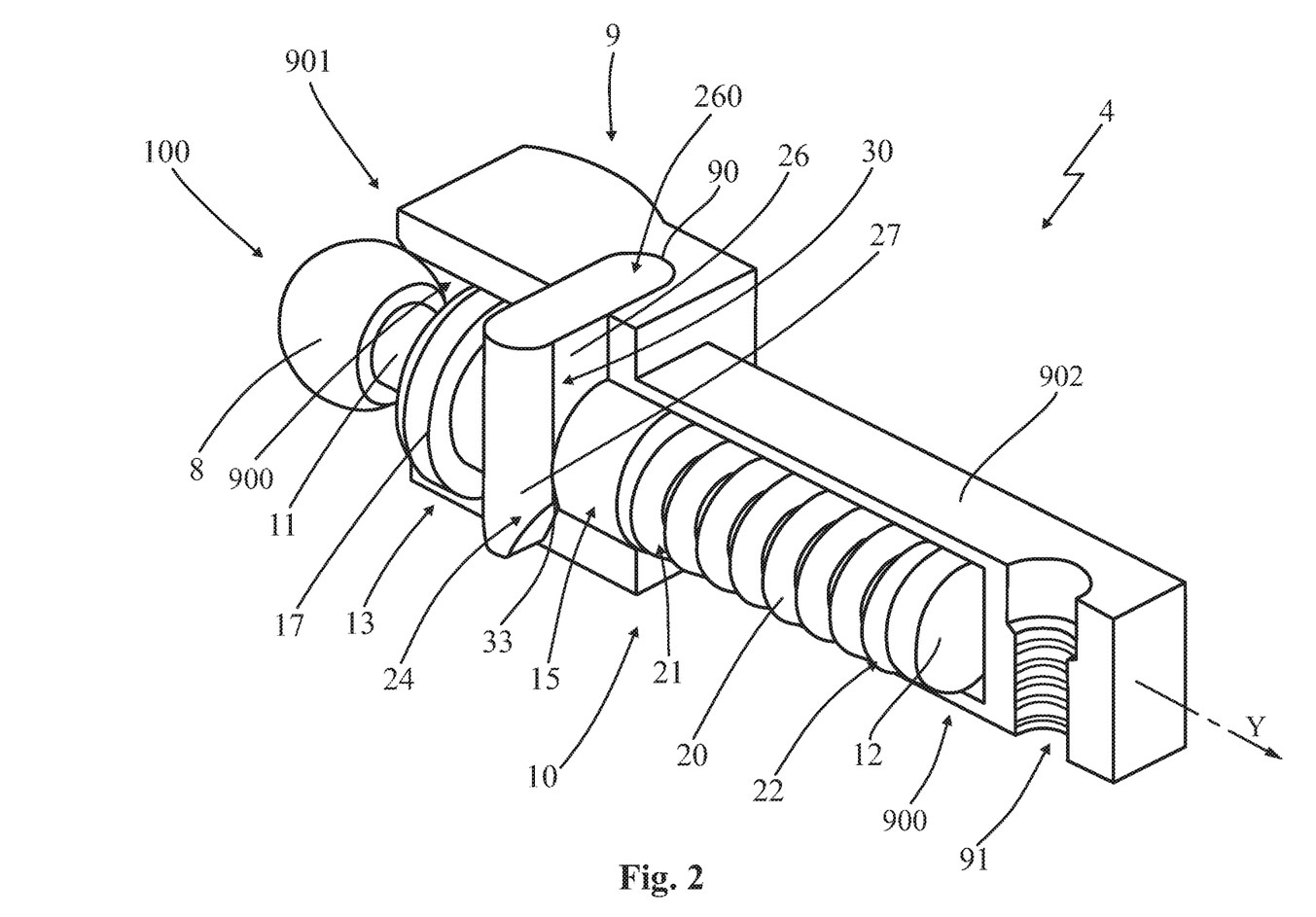
FIG. 2 shows a perspective and partially sectional view of a first articulation element of the hinge of the present invention in accordance with a first embodiment.
Figure 3:
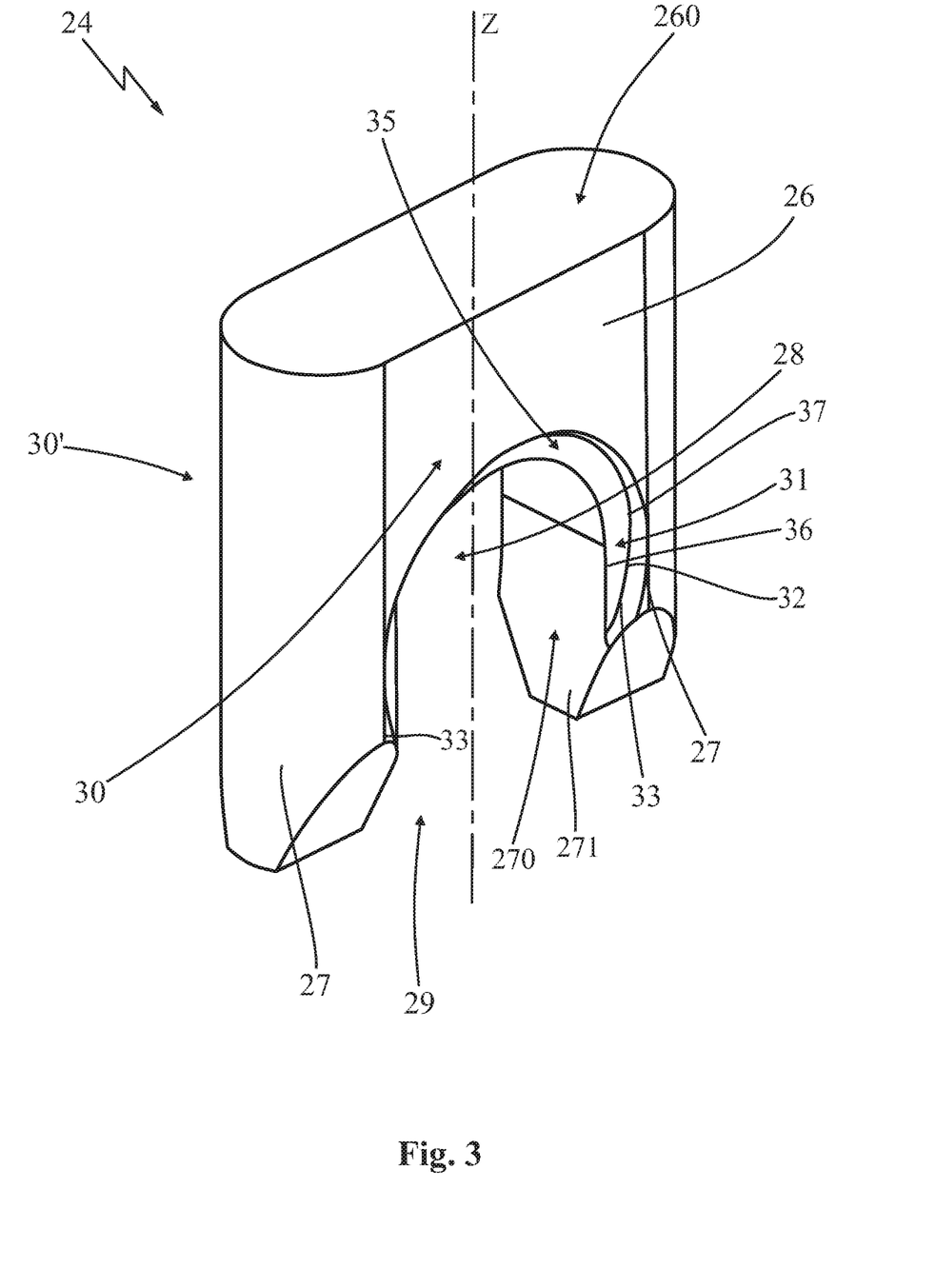
FIG. 3 shows a perspective view of a detail of the first articulation element of FIG. 2 relative to a fork-shaped body.
Figure 9:
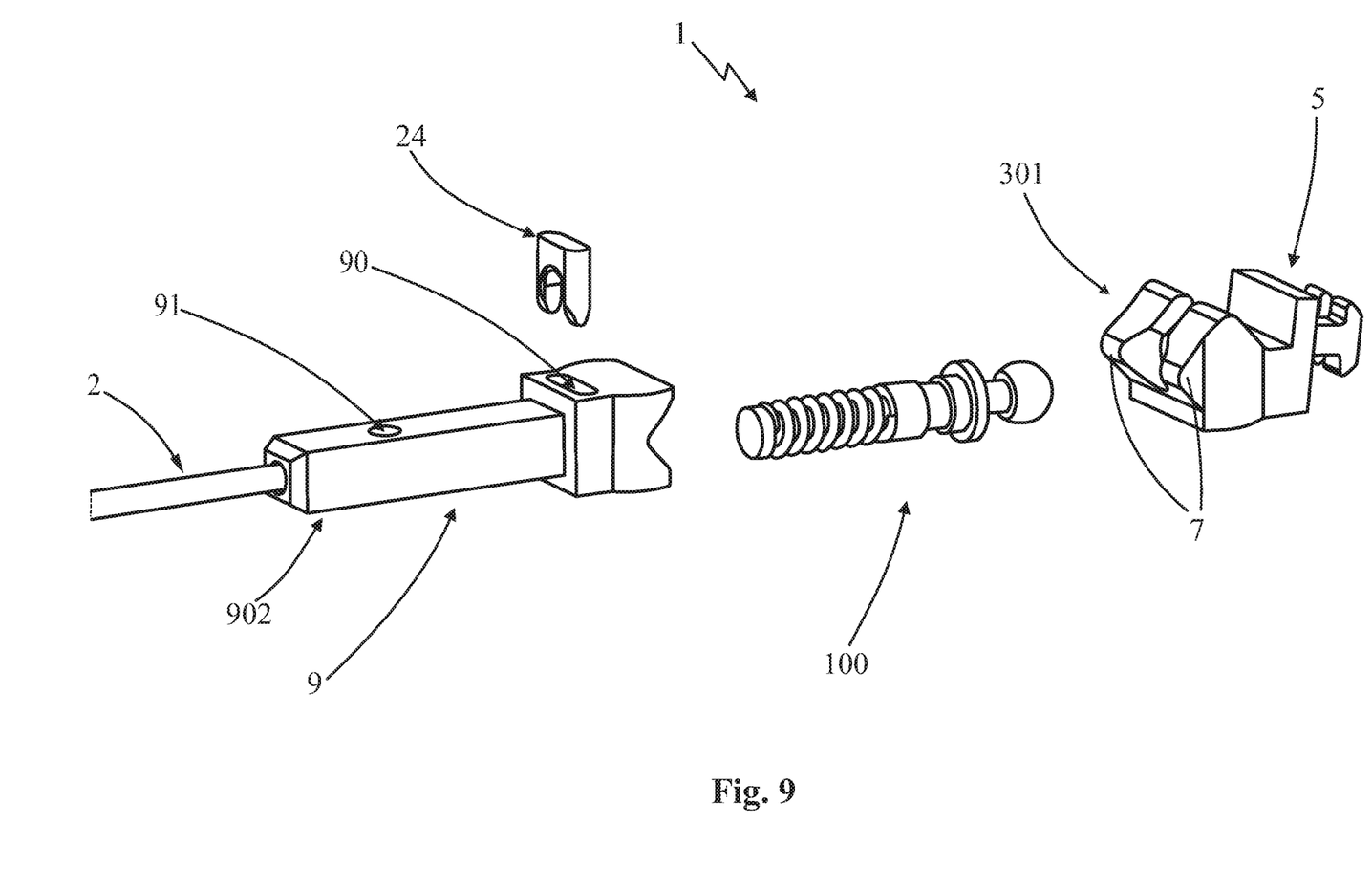
FIG. 9 shows a perspective view of the elastic hinge according to the present invention and in accordance with an embodiment of FIGS. 1-5, with the first and the second articulation element illustrated therein.

Otherwise, in accordance with the embodiment illustrated in the enclosed FIGS. 2 and 9, the head 8 of the first articulation element 4 acts as a hinge pin, being made of spherical form and being housed in a counter-shaped niche made in the second articulation element 5, for example made in the central part of the two parallel shoulders 7. The engagement of the spherical head 8 in the niche defines an articulation between the first and the second component 2 and 3 of the frame of the eyeglasses.

In accordance with the present invention, different modes can be provided for fixing the first articulation element 4 to the temple 2 of the frame of the eyeglasses.

In accordance with one embodiment, the box-like body is embedded or inserted within a seat 200 made in the temple 2 and provided with an opening at the front face of the temple 2.

Otherwise the box-like body 9 is fixed to the internal face of the temple 2 at its articulation end.

The box-like body 9 of the first articulation element 4 is mechanically fixed to the temple 2 through entirely conventional fixing means, such as screws, welding or retention anchors embedded as an undercut in the material, e.g. plastic, of the temple.

For example, as indicated in FIG. 2, the fixing means of the box-like body 9 comprise a threaded hole 91 in which a screw (not indicated in FIG. 2) is susceptible of being engaged for the fixing to the temple 2.

Preferably the opening 901 of the seat 900 of the box-like body 9 is placed at the front face 201 of the temple 2 and is directed towards the second articulation element 5.

Hereinbelow, the term front will indicate the direction of the eyeglasses directed towards the end piece 3, and the term rear will indicate the direction opposite that of front towards the free termination of the temples.

The mechanical fixing of the rod-like element 11 to the back of the head 8 can be obtained by engaging an initial section of the rod-like element, opposite the enlarged terminal element 12, in a blind hole made on the rear face of the head 8 of the carriage 10.

Advantageously, the aforesaid initial section of the rod-like element 11 is forced into the blind hole made on the rear face of the head 8, such that it engages via friction following plastic deformation.

Otherwise, the initial section of the rod-like element 11 can be mechanically fixed in the blind hole obtained in the head 8 by means of screwing, thus preventing the operation of plastic deformation of crimping.

Otherwise, the head portion 8 and the rod-like element 11 of the carriage 10 can be integrally made, e.g. via molding.

Preferably the head 8, the rod-like element 11 and the enlarged terminal element 12 of the carriage 10 are made of metal material, e.g. steel.

Advantageously, the seat 900 of the box-like body 9 comprises a portion that is enlarged starting from the opening 901 and an elongated portion 902 that is contiguous and in communication with the enlarged portion and having section lower than the latter.

According to the present invention the first articulation element 4 also comprises a bush 13 provided with a through hole 14, extended along the longitudinal extension direction Y, susceptible of slidably housing the rod-like element 11 of the carriage 10 and acting as guide for the aforesaid rod-like element 11 during its axial sliding in the seat 900 of the box-like body 9, along the axis Y, due to the movement of the temple 2.

The through hole 14 of the bush 13 is advantageously counter-shaped with respect to the section of the rod-like element 11 and has size adapted to allow the rod-like element to easily slide within the through hole 14.

Advantageously, the enlarged portion of the seat 900 at least partially houses the head 8 of the carriage and at least partially houses the bush 13.

The elongated portion 902 is engaged by the rod-like element 11 and preferably has a transverse size substantially slightly greater than that of the enlarged termination element 12 of the rod-like element 11.

The first articulation element 4 also comprises a helical spring 20 coaxially mounted around the rod-like element 11 of the carriage 10 and operatively interposed between the enlarged terminal element 12 of the rod-like element 11 and the bush 13.

For such purpose, the helical spring 20 defines a central hole with transverse size greater than that of the rod-like element and greater than that of the through hole 14 made on the bush 13, and smaller than that of the enlarged termination element 12. of the rod-like element 11.

Due to such size characteristic, the spring 20 is interposed in abutment against the bush 13 and the enlarged terminal element 12 of the rod-like element 11 of the carriage 10.

The action of the spring 20 is aimed to retain, by means of an elastic expansion force, the carriage 10 within the seat 900 made in the box-like body 9.

The first articulation element 4 also comprises at least one retention element mechanically associated with the box-like body 9, in order to lock the bush 14 with respect to the box-like body 9.

The box-like body 9 is provided with a shaped hole 90 obtained starting from its external surface and in communication with the seat 900 of the same box-like body 9.

The bush 13 is then provided with a radially projecting first shoulder 25 and the retention element comprises a fork-shaped body 24 inserted in the shaped hole 90 and engaged with the bush 13 in a straddling manner in a position interposed between the aforesaid projecting first shoulder 25 of the bush and the head 8 of the carriage 10.

Due to the present invention, the fork-shaped body 24 of the retention element receives the first shoulder 25 of the bush 13 in abutment, since the latter is pushed against the fork 24 by the helical spring 20. In this manner, the carriage can only be thrust towards the bottom of the seat 900 and has its end stop in the fork towards the opening 901 of the seat 900 of the box-like body.

More in detail, the bush 13 is provided on the rear with a radially projecting first enlarged annular portion 15 which frontally defines the aforesaid first shoulder 25, intended as the surface of the first enlarged annular portion frontally directed towards the head of the carriage 10.

The aforesaid first enlarged annular portion 15 has a transverse size (diametral) substantially equal to that of the seat 900 of the box-like body 9, or preferably and more precisely of the elongated portion 902 of the seat 900.

Preferably the bush 13 is provided with a second narrow annular portion 16, contiguous with the first projecting annular portion 15 and having a smaller transverse size than that of the first enlarged annular portion 15.

The fork is inserted astride the aforesaid second narrow annular portion 16.

In accordance with the embodiments illustrated in the enclosed figures, the bush 13 is completely contained within the seat 900 defined by the box-like body 9 with a front part contained in the enlarged portion of the seat 900 and with a rear part contained in the elongated portion 902.

In the case of the above-described embodiment and illustrated in FIG. 2, in which the head 8 of the carriage 10 has spherical form, the bush 13 also provides for a further annular flange 17 placed at the front end of the same bush 13, which radially projects and is maintained in abutment by the action of the spring 20 against the shoulder of the box-like body 9 which delimits the narrowing between the enlarged portion of the seat 900 and the narrower elongated portion 902.

Figure 6:
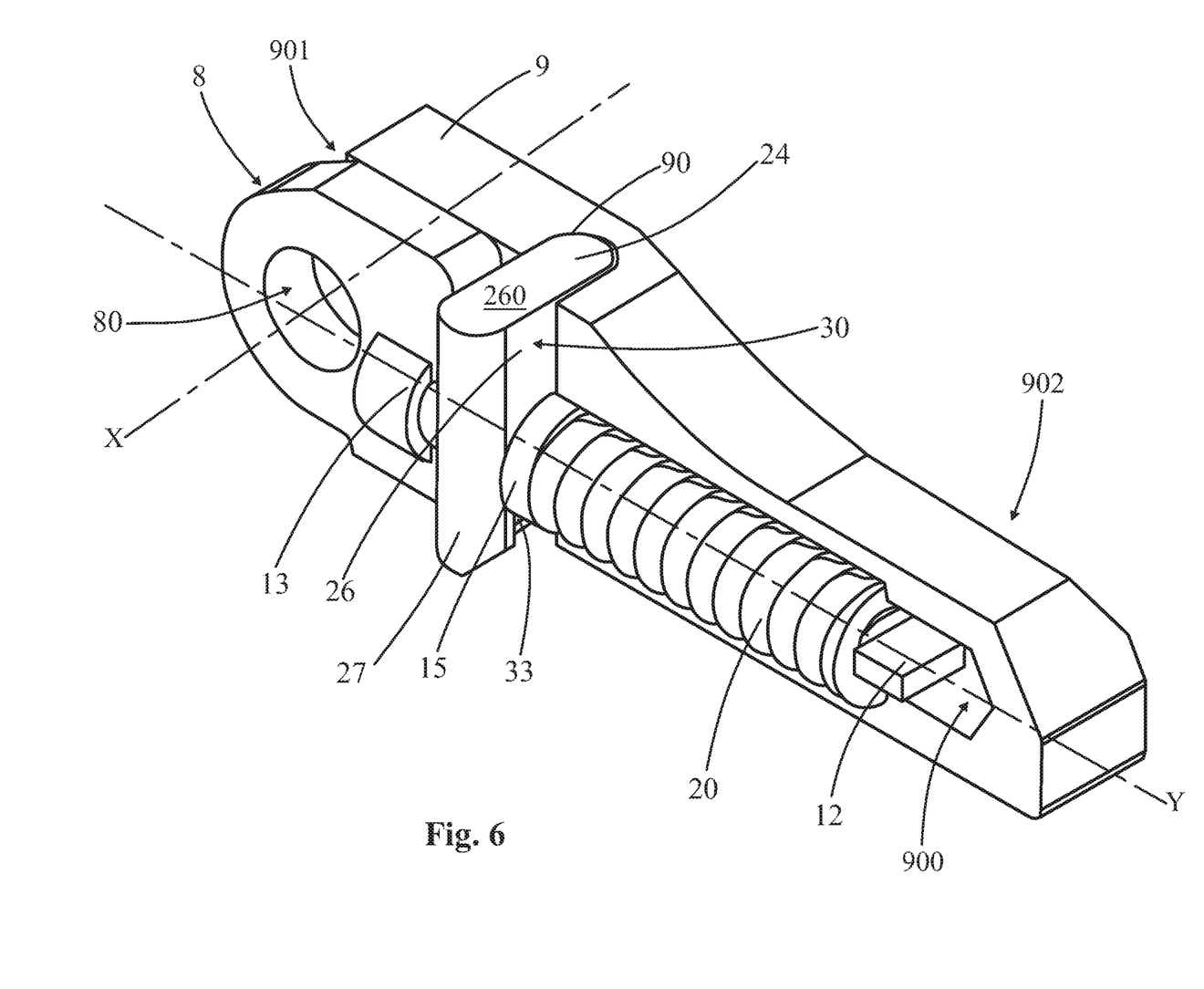
FIG. 6 shows a perspective and partially sectional view of a first articulation element of the hinge of the present invention in accordance with a second embodiment.
Figure 7:
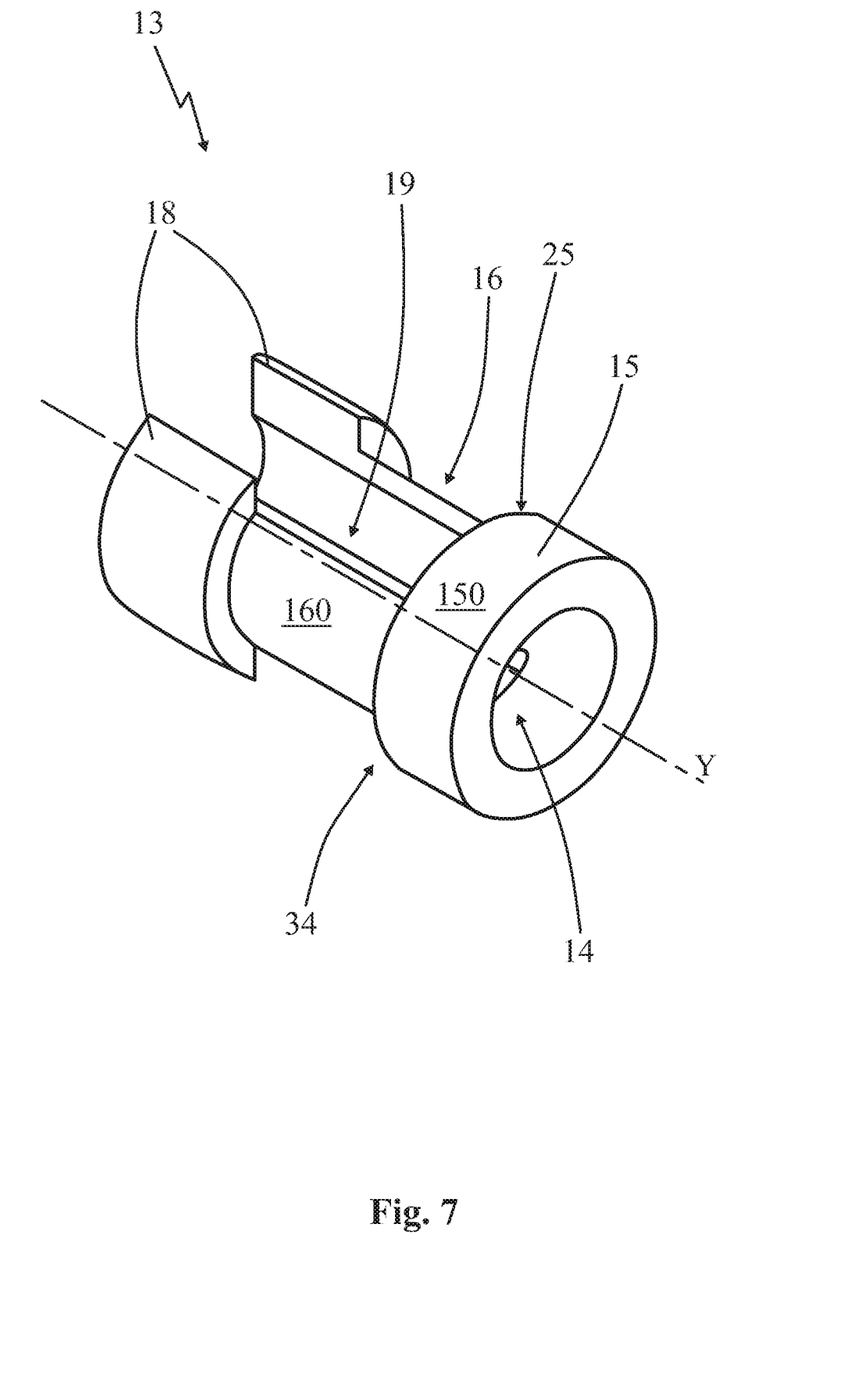
FIG. 7 shows a perspective view of a detail of the first articulation element of FIG. 6 relative to a bush.
Figure 8:
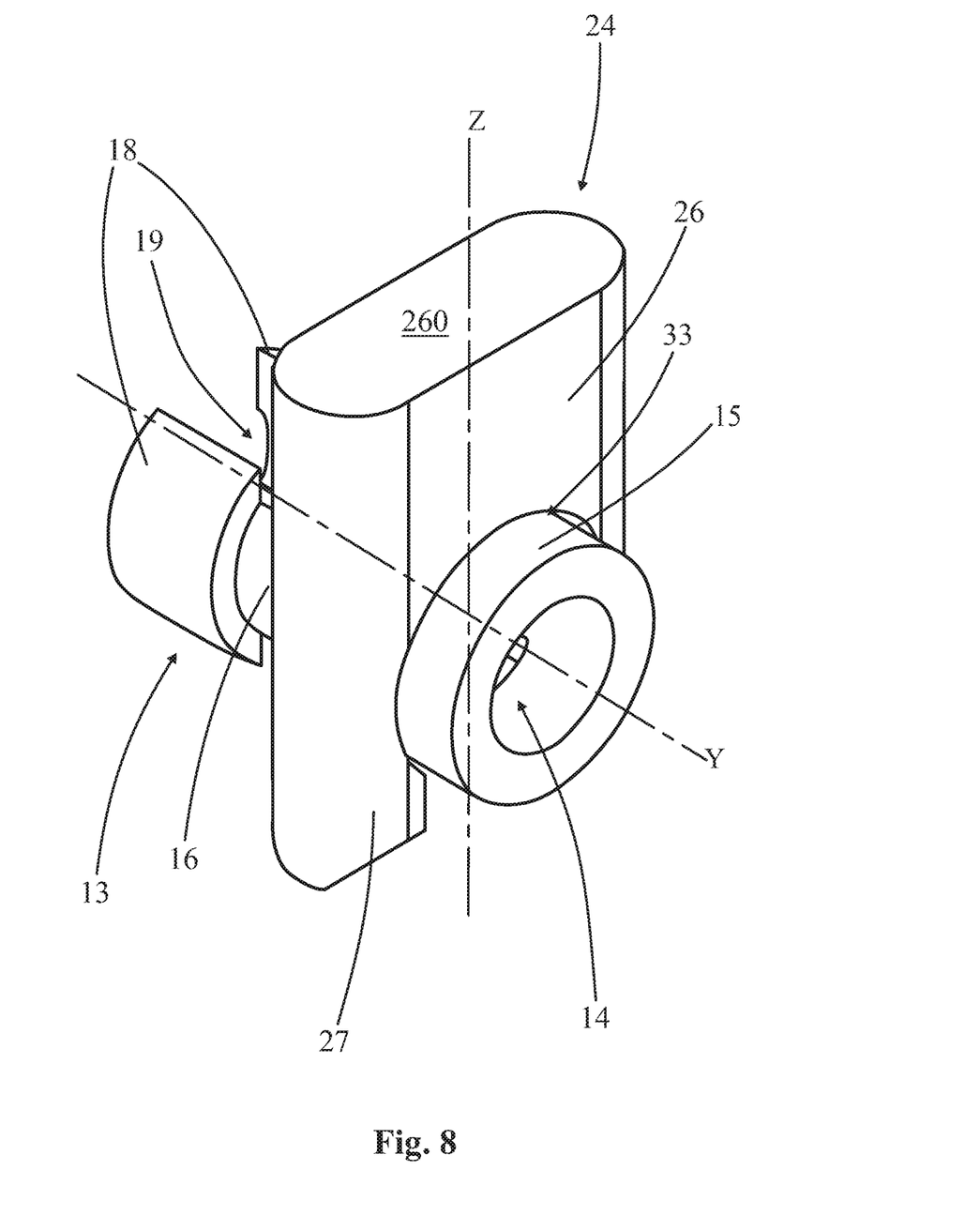
FIG. 8 shows a perspective view of a detail of the first articulation element of FIG. 6 relative to the fork-shaped body engaged on the bush.

Otherwise, in accordance with the embodiment shown in the enclosed FIGS. 6 to 8, and in which the head 8 of the carriage 10 has the shape of a plate with a through hole for the passage of the pin, the bush 13 is in this case frontally provided with two curved tabs 18 radially projecting with respect to the second narrow annular portion 16, which delimit a longitudinal notch 19. The latter is also extended over the section of the second narrow annular portion 16 and constitutes a guide seat for the head 8 with plate-like form. The same curved tabs 18 define the second shoulder 39 which together with the first shoulder 25 delimits the second narrow annular portion 16.

In operation, when the temples 2 are rotated around the hinge pin, between the closed position and the open or over-travel position, the rear surfaces of the shoulders 7 slide on the front surface of the box-like body 9 and consequently the carriage 10 slides in the seat 900 of the box-like body 9, overcoming the reaction force of the spring 20.

Advantageously the first enlarged annular portion 15 and the second narrow annular portion 16 of the bush 13 respectively define a first external surface 150 and a second external surface 160, both substantially cylindrical in accordance with the preferred embodiment illustrated in the enclosed figures.

The abovementioned first shoulder 25 is radially projecting from the second external surface 160 of the second narrow annular portion 16 of the bush 13 and connects the first external surface 150 of the enlarged annular portion 15 to the second external surface 160 of the second annular portion 16.

According to the preferred embodiment of the present invention illustrated in the enclosed figures, the fork-shaped body 24 is provided with a transverse connection portion 26, from whose lateral ends two parallel legs 27 depart.

Advantageously the shaped hole 90 is counter-shaped with respect to the transverse connection portion 26 of the fork-shaped body 24, so as to house the latter in a precise manner.

The transverse connection portion 26 and the two parallel legs 27 jointly delimit a through opening 28 extended along the axis Y, i.e. for the entire width of the fork-shaped body 24. Such through opening 28 is susceptible of being crossed by the bush 13 and in particular by its narrow annular portion 16.

The shaped hole 90 of the box-like body 9 defines, starting from its opening on the surface of the box-like body 9 towards the seat 900, a connection direction Z which is substantially orthogonal to the extension direction identified by the axis Y.

In accordance with the elastic hinge embodiment illustrated in FIG. 6, the aforesaid connection direction Z is also perpendicular to the axis X along which the hinge pin is extended.

The through opening 28 of the fork-shaped body 24 is provided with a passage section 29 arranged opposite the second transverse connection portion 26 of the same fork-shaped body 24 in the connection direction Z.

The passage section 29 allows engaging in the step of mounting the first hinge body 4, the fork-shaped body 24 on the bush 13 in a straddling manner by means of a simple insertion of the fork-shaped body 24 in the shaped hole 90 of the box-like body 9. For such purpose, the second narrow annular portion 16 of the bush 13 and the shaped hole 90 of the box-like body 9 are aligned along the connection direction Z.

In accordance with an advantageous characteristic of the elastic hinge 1, object of the present invention, the fork-shaped body 24 defines a rear face 30, directed to the rear towards the spring 20, on which at least one groove 31 is obtained, advantageously arranged at the through opening 28, i.e. around its curved edge.

The aforesaid groove 31 defines at least one engagement portion 33 with the bush 13. More in detail, the bush 13 is provided with at least one frontally projecting element 34 inserted in the groove 31 and susceptible of interfering with its aforesaid engagement portion 33 along the connection direction Z.

Advantageously, the groove 31 is defined by a perimeter groove obtained at the curved edge of the through opening 28 of the fork-shaped body 24 and is defined by a rear wall 36 and by an axial shoulder 37, preferably orthogonal to each other.

More in detail, the rear wall 36 is parallel to the rear face 30 of the fork-shaped body 24 with respect to which it is recessed in the longitudinal direction Y, creating a step with the axial shoulder 37. The axial shoulder 37 is orthogonal to the aforesaid rear face 30 of the fork-shaped body 24 and to the rear wall 36 and is placed to connect therebetween.

The perimeter groove of the groove 31 is extended over an arc greater than 180 degrees so as to define, with its end portions by means of the axial shoulder 37, two engagement portions 33 susceptible of interfering with the bush along the connection direction Z in the direction of extraction of the fork-shaped body from the shaped hole 90 of the box-like body 9.

More in detail, the frontally projecting element 34 which is engaged with the two engagement portions 33 of the groove 31 made on the aforesaid rear face 30 of the fork-shaped body 24 is constituted by the first shoulder 25 of the bush 13. Such first shoulder 25 advantageously abuts against the rear wall 36 of the groove 31 in order to interfere with the two engagement portions 33 of the axial shoulder 37 of the groove 31.

More clearly, the groove 31 defines two engagement portions 33 placed at its terminations which are angularly placed beyond the 180° subtended by the groove around the opening 28 of the fork-shaped body 24. Such engagement portions 33 are operatively susceptible of at least partially enclosing the first shoulder 25 of the bush 13 so as to prevent the aforesaid movements along the connection direction Z of the fork-shaped body 24.

Of course, such shape engagements for constraining the movements along the connection direction Z of the fork-shaped body 24 can also be obtained in a manner different from that described, without departing from the protective scope of the present patent.

For example, one or more shaped female seats (not shown in the enclosed figures and acting as engagement portions 33) can be provided on the rear face 30 of the fork-shaped body 24 and the same number of corresponding shaped male connections (acting as frontally projecting elements 34) (not shown in the enclosed figures) can be provided on the bush 13 shaped so as to interfere with the movements along the connection direction Z of the fork-shaped body 24. In particular such shaped female seats are provided with a retention wall defining the aforesaid engagement portion 33 orthogonal to the rear face 30 of the fork-shaped body 24 and directed towards the through opening 28 of the fork-shaped body, and such shaped male connections are provided with a corresponding wall advantageously parallel to the aforesaid retention wall and opposite thereto in order to lock the aforesaid movements.

Otherwise, a reversal of the male and female role of the bush 13 and of the fork-shaped body 24 can be provided, for example the fork-shaped body can provide for male projecting elements 34 (not shown in the enclosed figures), projectingly extended from the rear face 30 along the direction Y, and the first shoulder 25 can provide for grooves 31 (not shown in the enclosed figures) that are counter-shaped with respect to the aforesaid male projecting elements 34 (or at least able to receive such projecting elements 34) in order to prevent movements along the connection direction Z of the fork-shaped body 24.

The parallel legs 27 of the fork-shaped body 24 have two facing internal faces 270 provided with flat terminal portions 271 parallel to each other and spaced at least by the diameter of the second narrow annular portion 16 of the bush 13.

In accordance with a preferred embodiment of the elastic hinge 1, according to the present invention the transverse connection portion 26 of the fork-shaped body 24 is provided with a flat face 260 orthogonal to the connection direction Z, oriented in a direction opposite the passage section 29 of the through opening 28 of the fork-shaped body 24.

Moreover, advantageously, the flat face 260 of the transverse connection portion 26 of the fork-shaped body 24 is coplanar with an external face of the box-like body 9.

Figure 4:
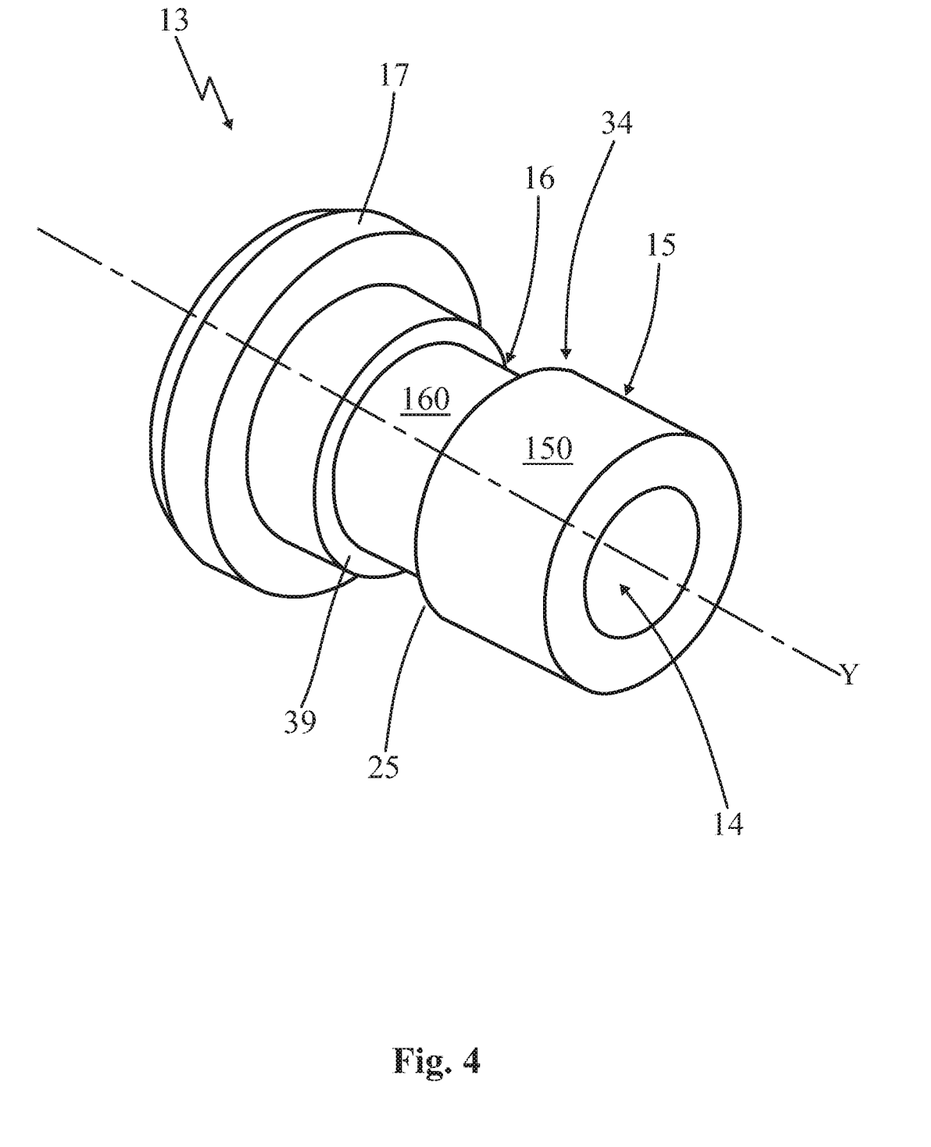
FIG. 4 shows a perspective view of another detail of the first articulation element of FIG. 2 relative to a bush.
Figure 5:
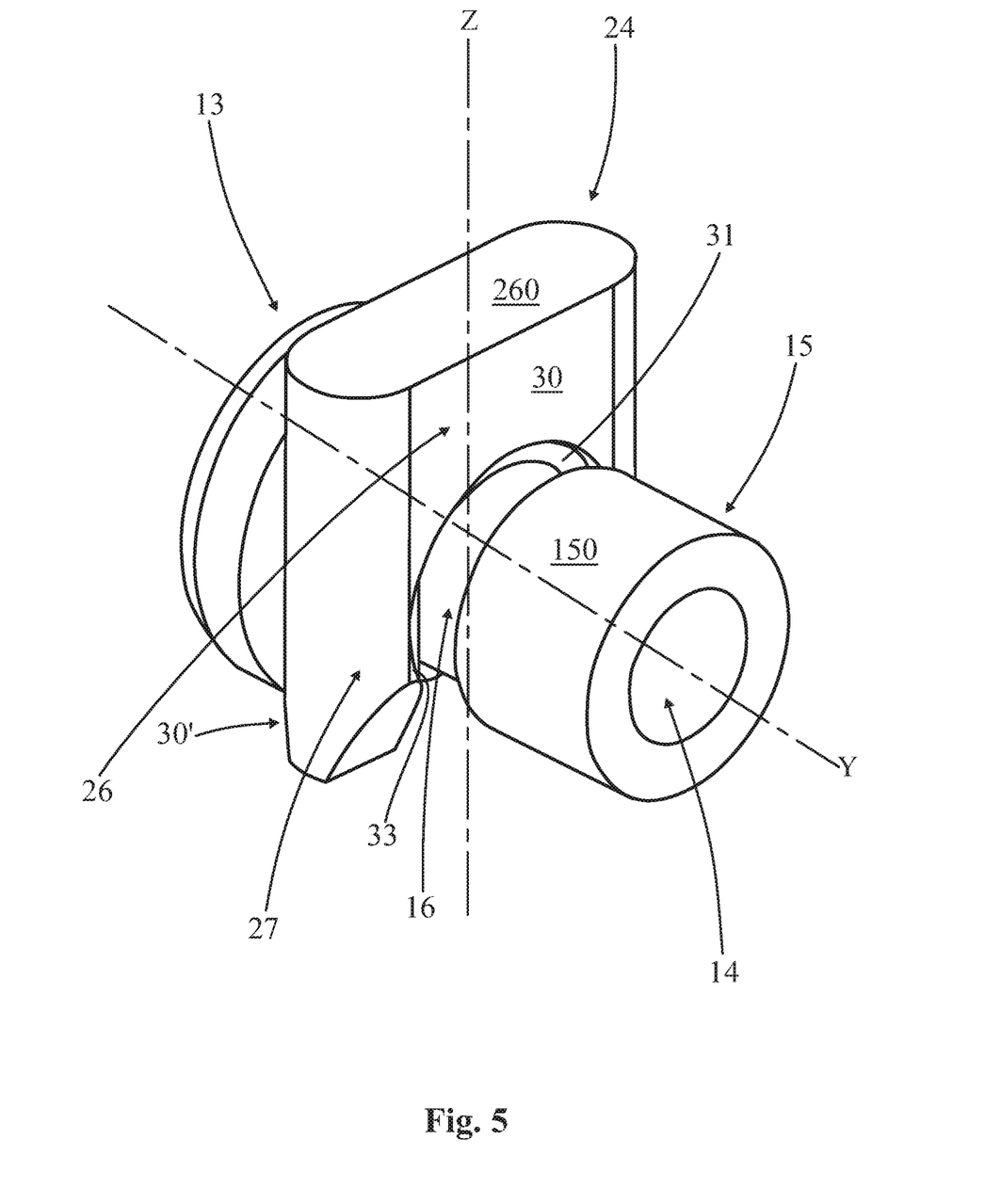
FIG. 5 shows a perspective view of a detail of the first articulation element of FIG. 2 relative to the fork-shaped body engaged on the bush.

In accordance with the embodiment, shown in FIG. 4, the second narrow annular portion 16 of the bush 13 is defined by the first shoulder 25 and by a second shoulder 39. Such second shoulder 39 has a radial extension advantageously equal to that of the first shoulder 25.

In accordance with such embodiment, the fork-shaped body 24 has a width, measured along the axis Y, less than the distance between the first and the second shoulder 25 and 39 so as to allow having sufficient clearance for extracting the first shoulder 25 from the abutment position within the groove 31 with perimeter groove shape.

Preferably the fork-shaped body 24 identifies a second front face 30', which has the same characteristics of the above-described rear face 30.

Hereinbelow, a method is described for the assembly of the elastic hinge 1, as described above, to the eyeglass frame, regarding which for the sake of description simplicity the reference numbers and nomenclature will be maintained.

The method comprises a step of assembly of an elastic device 100 by means of insertion of the rod-like element 11 in the bush 13 and in the axial hole of the helical spring 20, such that at the end of assembly the spring 20 is interposed between the bush 13 and the enlarged terminal element 12 of the rod-like element 11, as already better specified above.

Then, a step is provided for inserting the elastic device 100 thus assembled within the seat 900 of the box-like body 9 through its the opening 901.

Then, a step is provided for fixing the box-like body 9 to a first component, in particular a temple 2, of the eyeglass frame. The step of inserting the elastic device 100 preferably occurs before the fixing of the box-like body to the temple 2; the latter step occurs for example by means of a screw, as illustrated in the enclosed figures.

The method further provides for a step of introducing the fork-shaped body 24 in the shaped hole 90 made on the box-like body 9 along the connection direction Z, up to engaging the fork-shaped body 24 astride the second narrow annular portion 16 of the bush 13 upstream of the first shoulder 25 with respect to the longitudinal direction Y in the direction of the spring 20.

Advantageously, the step of introducing the fork-shaped body 24 into the shaped hole 90 of the box-like body 9 is preceded by a step of longitudinal displacement of the bush 13 along the longitudinal axis Y of the seat 900 of the shaped body 9 against the action of the spring 20 into a retreated position (i.e. towards the bottom of the seat 900) in order to bring the second narrow annular portion 16 of the bush 13 to be aligned with the shaped hole 90 of the box-like body 9.

After the step of introducing of the fork-shaped body 24 into the shaped hole 90 of the box-like body 9 has taken place, a step is then executed for releasing the bush 13 in a manner such that the frontally projecting element 34 of the bush 13 is inserted in the groove 31 of the rear face 30 of the fork-shaped body 24 in order to interfere with its engagement portion 33 along the connection direction Z in the direction of extraction of the fork-shaped body 24 from the shaped hole 90 of the box-like body 9.

Following the step of release of the bush 13, the spring 20 by means of expansive action pushes the first shoulder 25 of the bush against the rear face 30 of the fork-shaped body 24. Due to this received thrust, the at least one projecting element 34 present on the bush 13 is inserted within the at least one corresponding groove 31 present on the rear face 30 of the fork-shaped body 24. In this manner, the fork-shaped body 24 interferes with the bush 13 for movements along the connection direction Z, in particular in the direction of extraction of the fork-shaped body 24.

The step of articulation of the two hinge elements 4 and 5 can be made in an entirely conventional manner by means of a pin in accordance with the embodiment of FIG. 6 (in which however the pin is not illustrated).

In the case of the embodiment illustrated in the enclosed FIGS. 10A-10G, the spherical head of the first articulation element 4 is associated with the female seat of the second articulation element 5 before the step of inserting the fork-shaped body 24.

Figure 10A:
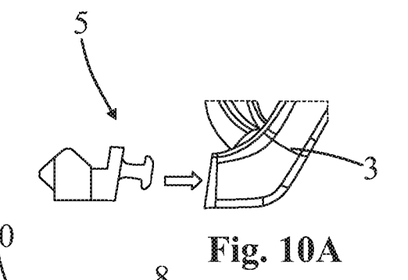
Figure 10C:
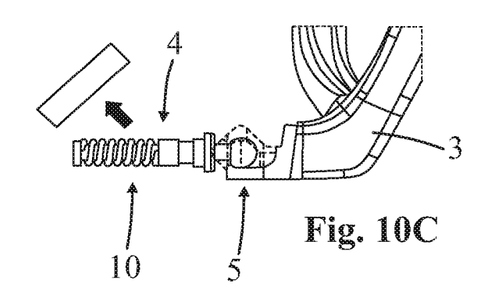
Figure 10D:
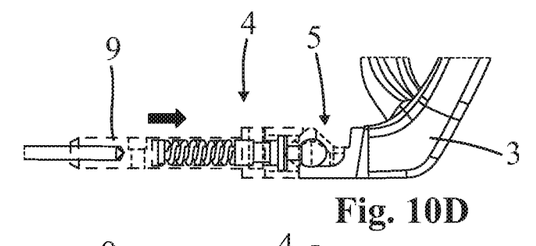

Subsequently, the carriage 10 of the articulation body 4 is inserted in the seat 900 of the box-like body 9 (FIG. 10D).

Figure 10E:
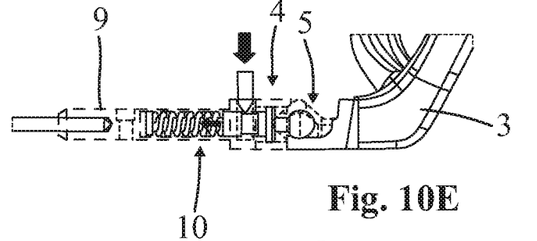
Figure 10F:
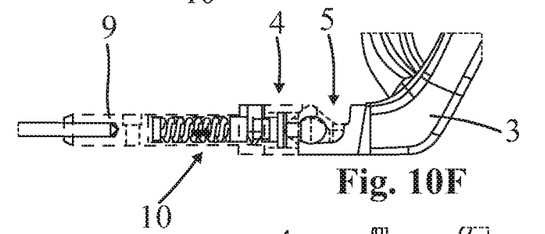
Figure 10G:
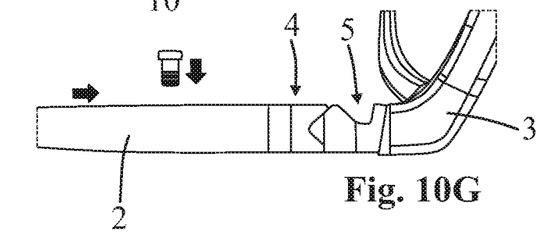

At this point, it will be possible to move the bush 13 as indicated in FIG. 10E by pushing it longitudinally from the opening 901 of the seat 900 towards the elongated body 902 so as to cause the retreating thereof. The thrust of the bush 13 back towards the bottom of the seat 900 can be obtained simply through the interference with the fork-shaped body 24 when this is inserted in the shaped hole 90 of the box-like body 9.

According to a preferred embodiment, when the fork-shaped body 24 is completely inserted in the shaped hole 90 of the box-like body 9, its flat face 260 is coplanar with the external face of the box-like body 9.

If it is desired to dismount the carriage 10, i.e. disassemble it from the box-like body 9, it will be sufficient to push the bush 13 towards the interior of the seat 900 into the retreated position so as to compress the spring 20. The fork-shaped body will be once again idle and therefore easily extractible from the shaped hole 90 of the box-like body 9.

The hinge thus conceived therefore attains the pre-established objects and in particular it is capable of moving the temple 2 up to an over-travel position, maintaining the hinge 1 firmly anchored to the frame of the eyeglasses and simultaneously it is susceptible of being mounted with an extremely easy and inexpensive process that allows the dismounting and mounting of the carriage from/on the box-like body 9 for a facilitated maintenance.

It is in any case clear that modifications can be made to the elastic hinge described up to now, without departing from the protective scope of the present patent.

In addition, all details can be substituted by technically equivalent elements and the sizes, shapes and materials used can be of any type depending on the requirements.

The invention claimed is:

1. An elastic hinge for eyeglasses, which comprises:

a first articulation element (4) mechanically associable with a first component of an eyeglass frame; and a second articulation element (5) mechanically associable with a second component of the eyeglass frame and rotatably coupled to the first articulation element (4);

said first articulation element (4) comprising:

a box-like body (9) delimiting a seat (900) provided with an opening (901) directed towards said second articulation element (5);

a carriage (10) slidably housed within the seat (900) of said box-like body (9), provided with:

a head (8) at least partially projecting from the opening (901) of the seat (900) of said box-like body (9);

a rod-like element (11), provided with a main extension along a longitudinal direction (Y), fixed to said head (8) and provided with an enlarged terminal element (12) at an opposite end with respect to said head (8);

a bush (13) provided with a through hole (14) slidably housing said rod-like element (11);

a spring (20), wound around said rod-like element (11), provided with a first end (22) in abutment against said enlarged terminal element (12) and with a second end (21) in abutment against said bush (13);

a retention element mechanically associated with said box-like body (9), in order to lock said bush (13) with respect to said box-like body (9);

wherein said box-like body (9) is provided with a shaped hole (90) obtained in communication with said seat (900);

wherein said bush (13) is provided with at least one radially projecting first shoulder (25);

wherein said retention element comprises a fork-shaped body (24), which is inserted in said shaped hole (90), is engaged with said bush (13) in a straddling manner and interposed between said first shoulder (25) and the head (8) of said carriage (10).

2. The elastic hinge for eyeglasses of claim 1, wherein said bush (13) comprises a narrow annular portion (16), on which said fork-shaped body (24) is engaged in a straddling manner; wherein said narrow annular portion (16) is delimited by said first shoulder (25) and by a second shoulder (39) opposite and parallel to said first shoulder (25).

3. The elastic hinge for eyeglasses of claim 2, wherein said bush (13) is provided with a longitudinal notch (19), which is extended over said second shoulder (39) and over said second narrow annular portion (16) and acts as a guide for the head (8) of said carriage (10).

4. The elastic hinge for eyeglasses of claim 1, wherein said fork-shaped body (24) comprises:

a transverse connection portion (26);

two parallel legs (27), which are projecting from said transverse connection portion (26) and define a through opening (28), which houses said bush (13), and is provided with a passage section (29) opposite said transverse connection portion (26) along a connection direction (Z) orthogonal to the longitudinal direction (Y) of said rod-like element (11);

a rear face (30), which is directed towards said spring (20) and on which at least one groove (31) is obtained; said groove (31) being provided with at least one engagement portion (33);

wherein said bush (13) is provided with at least one frontally projecting element (34) inserted in said groove (31) and susceptible of interfering with said engagement portion (33) thereof along said connection direction (Z).

5. The elastic hinge for eyeglasses of claim 4, wherein said groove (31) is a perimeter groove arranged at an edge of the through opening (28) of said fork-shaped body (34), extended over an arc greater than 180 degrees, and provided with a rear wall (36) and with an axial shoulder (37); wherein the rear wall (36) is recessed with respect to said rear face (30) of said fork-shaped body (24) and said axial shoulder (37) is placed to connect between said rear wall (36) and said rear face (30); wherein the first shoulder (25) of said bush (13) defines said engagement portion (33) and is inserted in said groove (31), in abutment against the rear wall (36), in order to interfere with the axial shoulder (37) of the groove (31) of said fork-shaped body (24) along said connection direction (Z).

6. The elastic hinge for eyeglasses of claim 4, wherein the transverse connection portion (26) of said fork-shaped body (24) is provided with a flat face (260) orthogonal to said connection direction (Z), oriented in direction opposite said passage section (29).

7. The elastic hinge for eyeglasses of claim 6, wherein the flat face (260) of the transverse connection portion (26) of said fork-shaped body (24) is coplanar with an external face of said box-like body (9).

8. The elastic hinge for eyeglasses of claim 4, wherein said bush (13) comprises a narrow annular portion (16), on which said fork-shaped body (24) is engaged in a straddling manner; wherein said narrow annular portion (16) is delimited by said first shoulder (25) and by a second shoulder (39) opposite and parallel to said first shoulder (25); wherein said parallel legs (27) projecting from the transverse connection portion (26) of said fork-shaped body (4) have two facing internal faces (270), each provided with a flat terminal portion (271); wherein said flat terminal portions (271) are parallel to each other and are spaced at least by the diameter of the narrow annular portion (16) of said bush (13).

\* \* \* \* \*